United States Patent [19]
Cullinan

[11] Patent Number: 5,870,934
[45] Date of Patent: Feb. 16, 1999

[54] ANTI-THEFT "O" TOOL AND SCREW SET FOR LICENSE PLATES

[76] Inventor: Terrance P. Cullinan, 4407 Myers Park Dr., Durham, N.C. 27705

[21] Appl. No.: 963,758

[22] Filed: Nov. 4, 1997

[51] Int. Cl.$^6$ .................................................. B25B 13/48
[52] U.S. Cl. ............................... 81/436; 81/460; 411/910
[58] Field of Search ...................... 81/436, 460; 411/910, 411/403, 404, 408, 378, 402, 410

[56] References Cited

U.S. PATENT DOCUMENTS

| | | |
|---|---|---|
| 755,804 | 12/1904 | Smith . |
| 2,140,449 | 12/1938 | Brown .................................... 81/436 |
| 2,173,707 | 9/1939 | Brown .................................... 81/460 |
| 3,236,275 | 2/1966 | Smith ..................................... 81/460 |
| 3,369,441 | 2/1968 | Kosar . |
| 3,675,694 | 7/1972 | Barlow .................................... 81/460 |
| 3,892,031 | 7/1975 | Bisbing . |
| 5,097,686 | 3/1992 | Plumer . |
| 5,214,987 | 6/1993 | Fenton, Sr. ............................. 81/460 |
| 5,353,667 | 10/1994 | Wilner .................................... 81/436 |
| 5,528,966 | 6/1996 | Coppejans ............................... 81/460 |
| 5,674,037 | 10/1997 | Lu ........................................ 411/404 |

*Primary Examiner*—Eileen P. Morgan
*Assistant Examiner*—Joni B. Danganan
*Attorney, Agent, or Firm*—Hoffman Wasson & Gitler

[57] ABSTRACT

A theft prevention system is disclosed wherein modified screw heads can be removed by only a specially configured tool. The screw heads have a central polygon groove with at least two grooves projecting outward from the polygon. The screw removal tool is adapted to mate with the polygon groove and the projecting grooves to accomplish removal and tightening of the screw.

19 Claims, 3 Drawing Sheets

ANTI-THEFT "O" TOOL AND SCREW SET FOR LICENSE PLATES

FIELD OF THE INVENTION

The present invention relates generally to threaded fasteners and tools therefore and more particularly to a set of tamper resistant screw heads having associated tools for insertion and removal wherein each tool only mates to one type of the set of screws.

BACKGROUND OF THE INVENTION

The impetus for thieves to steal cars is highly associated with other crimes. For example, before a criminal will rob a bank, commit a drive-by shooting, etc., the criminal will usually steal a car or its license plates. Not only are the car or its license plates of tremendous value in an of themselves, but the anonymity conferred to anyone in a stolen car or a vehicle tagged with stolen plates is vital in the commission of crime.

Unfortunately, there exists no reliable means of securing license plates to automobiles. Screws of the prior art do adequately protect against vehicle license plate theft. Many of the prior art screws fail in one of two ways. First, they may have a unique configuration which mates with a special tool, but the purpose is usually to get a better contact in order to reduce stripping. Examples of this are U.S. Pat. No. 3,369,441, issued to Kosar on Feb. 20, 1968, and U.S. Pat. No. 5,353,667, issued to Wilner on Oct. 11, 1994. Since their purpose is not to prevent removal, but rather to facilitate it, they have the ability to be removed by an ordinary screwdriver, entirely defeating the whole purpose of the present invention.

Another deficiency commonly found in prior art is the lack of any visual indication that a license plate has been secured with unconventional means. The problem is that with many different security screws available, the car dealer or mechanic must be able to easily identify the proper tool from a visual inspection. In the present invention, this is accomplished by simply looking at the notches with respect to the center of the screw and arriving at an orientation, much like the placement of the hands of a clock.

U.S. Pat. No. 3,892,031, issued to Bisbing on Jul. 1, 1975, and U.S. Pat. No. 3,241,408, issued to McCauley on Apr. 30, 1964, suffer in that they are either incapable of being varied or that if they are varied the different variations are not easily recognizable and all of the tools must be tried until the right tool is randomly arrived at.

U.S. Pat. No. 755,804, issued to Smith on Mar. 29, 1904, has different designs on the heads of screws, however, the designs are simply used for ornamentation and do not form the basis for engagement with a tool.

U.S. Pat. No. 5,097,686, issued to Plumer on Mar. 24, 1992, shows a device which requires a special tool to operate it. This differs substantially from the present device. First, Plumer is a lock and key combination. The key must pass into various layers of the lock in order engage the various mechanisms. Second, while the top layer of the lock is somewhat similar to the present invention, in that the lock has a circular opening and an intersecting notch, the lock differs in that it only has one such notch. Furthermore, the goal of the Plumer is not to have multiple tools, but only one. Therefore, there would be no need or reason to add additional notches to Plumer. This is point is important because the purpose of a screw, for purposes of the present invention, is to hold a license plate in place. License plates are valuable and loss is to be avoided. Therefore, the screw must be inserted tight enough to securely hold the plate. A tool having only one point of engagement, such as Plumer's device, cannot properly accomplish this goal.

Therefore a need has been established for a novel screw and removal tool combination which provides secure attachment of an item, primarily a license plate to a car, which deters unauthorized removal and at the same time facilitates easy removal by authorized personnel.

It is an object of the present invention to provide a secure method and apparatus for attaching license plates to vehicles.

It is a further object of the present invention to provide a reliable method for removing license plates to vehicles.

It is another object of the present invention to provide an apparatus for preventing unauthorized removal of license plates from motor vehicles.

It is also an object of the present invention to accord the owner of a vehicle with a simple and cost effective solution to the problem of vehicle license plate theft.

It is still another object of the present invention to provide a nearly infinite number of variations for a vehicle license plate safety device so as to maintain low manufacturing costs.

It is also another object of the present invention to provide an apparatus associated with license plate security which is fully functional in accomplishing its goals.

It is also an object of the present invention to provide a license plate security apparatus and method which is dependable, nearly tamper-proof, and of great simplicity but keen design.

SUMMARY OF THE INVENTION

The present invention presents a novel screw head which is not capable of removal with conventional screwdrivers. While typical screw heads are designed to mate with almost any screwdriver, the present invention presents screw heads which have either a central circular or polygonal groove in combination with at least two grooves projecting from the central groove. Because of the unique groove design, the present invention's screw heads necessitate a special tool for their tightening and loosening. The removal tool of the present invention is designed to mate and frictionally fit within the screw head designs.

The present invention also describes a kit which includes four screws with identical screw heads and a corresponding removal tool. For securing license plates to vehicles, the kit allows the user to tighten and loosen only the specific set of screws in the kit. To allow for nearly infinite numbers of unique screw heads, the size of the central groove on the screw head can be varied from kit to kit. Further, the projecting grooves can be positioned at various distances apart from one another.

DETAILED DESCRIPTION OF THE PREFERRED EMBODIMENT(s)

Figure 1B:
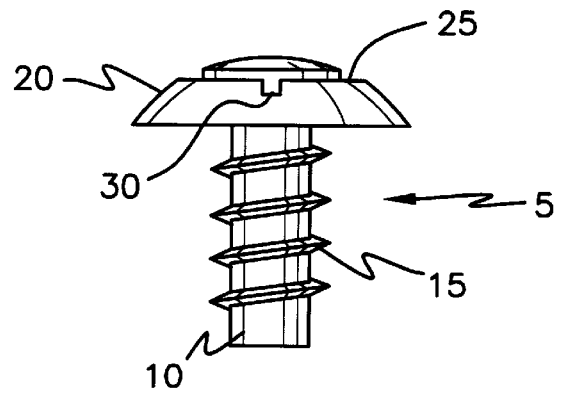
FIG. 1b is a side view of an "O" screw employed in the present invention.

Turning now to FIG. 1b, a side view of the an "O" screw (5) employed in the present invention is shown. The screw (5) has a shaft (10) which has threads (15). The threads (15) may turn in either the normal direction or may be reverse threaded, to further deter unauthorized removal. Attached to the shaft (10) is a head (20), shown here as a rounded head. The head (20) can be any shape desired, such as a flat head or tapered head. Atop the head (20) is a circular groove (25) (best shown in FIGS. 1a–4) surrounding a central projection (40) wherein the projection is at least equal to the height of the remainder of the head. The central projection (40) is simply the remainder of the screw head (20) and would be indistinguishable from the remainder of the screw head (20) if the circular groove (25) were not present.

Extending outwards from the circular groove (25) are straight notches (30,31). The notches (30,31) are cut to the same depth in the head (20) as the groove (25). There must be at least two notches (30,31), however, there may be more. FIGS. 1a, 2, 3, and 4 each show different embodiments of the screw (5) in that the relationship between the two notches (30,31) differs based upon the two notches' (30,31) angular placement relative to one another. This facilitates the production of various types of screws (5), each needing a different tool (50) to engage them.

Figure 6:
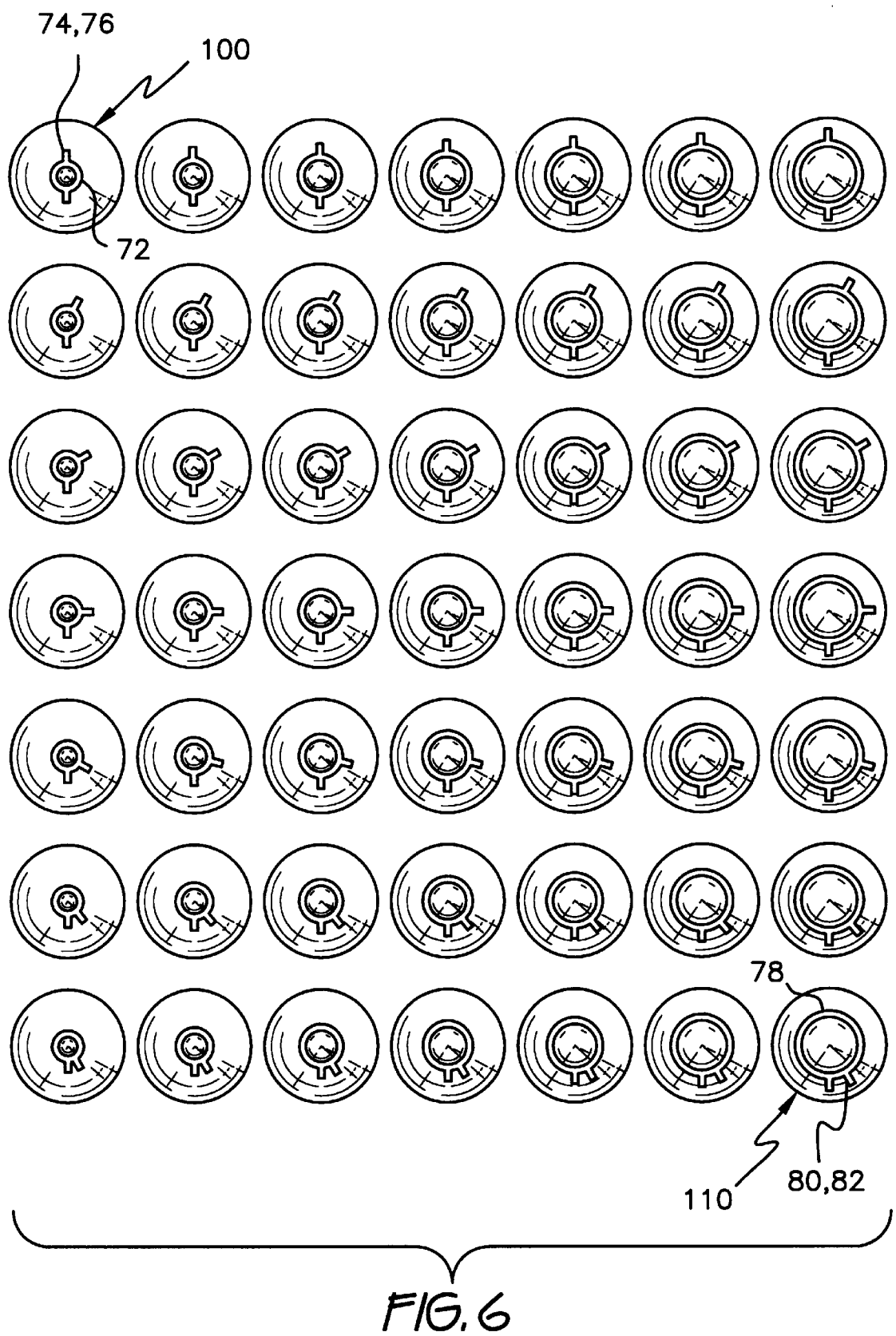
FIG. 6 is a top view of a series of head of "O" screws employed in the present invention.

The embodiments seen in FIGS. 1a–4 are not the only embodiments of the screw (5) and the two notches (30,31) possible. Other embodiments differ from each other in the size of the circular groove (25) and the placement of the notches (30,31). FIG. 6 shows a few more of the possible embodiments. A first alternative screw head (100) shows an alternative circular groove (72) which is very small and alternative notches (74, 76) which are aligned with each other. This is in comparison to a second alternative screw head (110) showing a second circular groove (78), which is comparatively much larger than alternative circular groove (72), and second alternative notches (80,82) which are rather closely positioned and pointing in almost the same direction.

Of course many more variations are possible than what is shown in the drawings. Rather than a circular groove (25), polygons may be employed such as a triangle or rectangle. It is critical, though, that there be no other connection between the notches (30,31 ) other than the circular groove (25). For instance, in FIG. 1a, if the central projection (40) were at all recessed with respect to the remainder of the head (20), then a regular screwdriver (not shown) could be inserted and would engage both notches (30,31). That would defeat the purpose of the present invention.

Figure 1A:
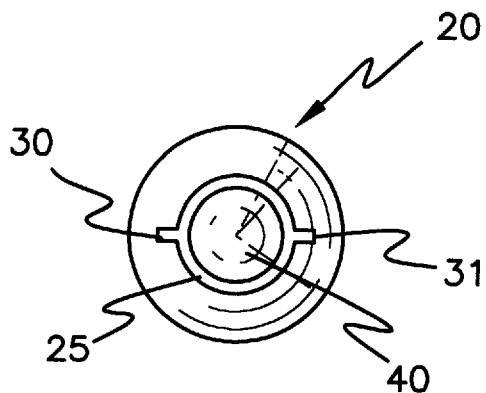
FIG. 1a is a top view of the head of an "O" screw employed in the present invention.
Figure 2:
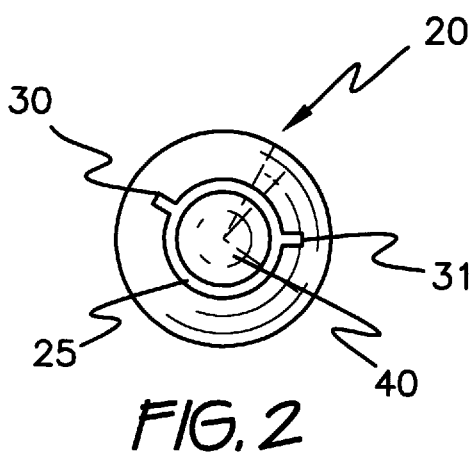
FIG. 2 is a top view of the head of a second "O" screw employed in the present invention.
Figure 3:
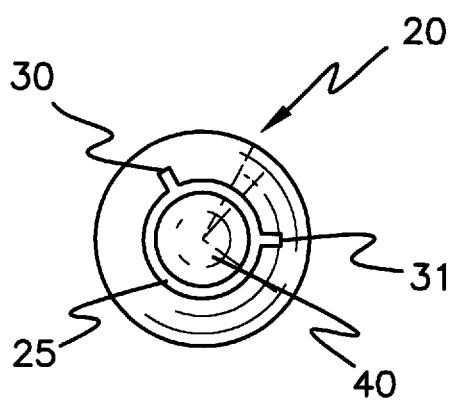
FIG. 3 is a top view of the head of a third "O" screw employed in the present invention.
Figure 4:
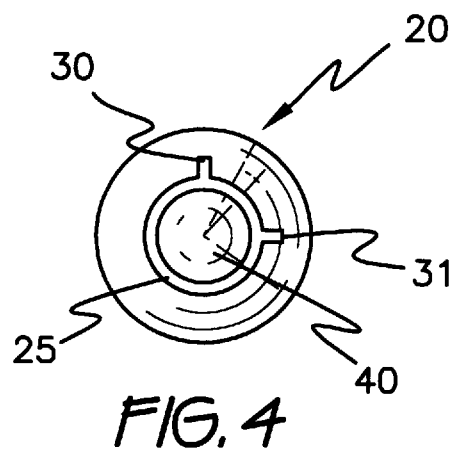
FIG. 4 is a top view of the head of a fourth "O" screw employed in the present invention.
Figure 5B:
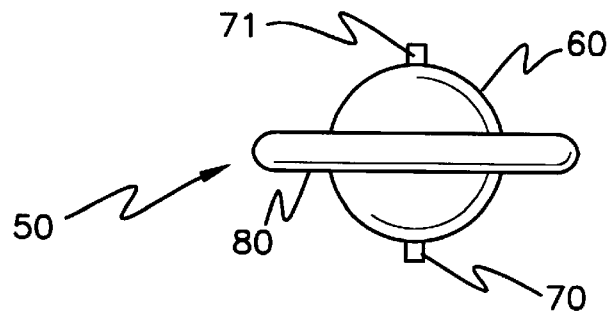
FIG. 5b is a top view of an "O" tool employed in the present invention.
Figure 5A:
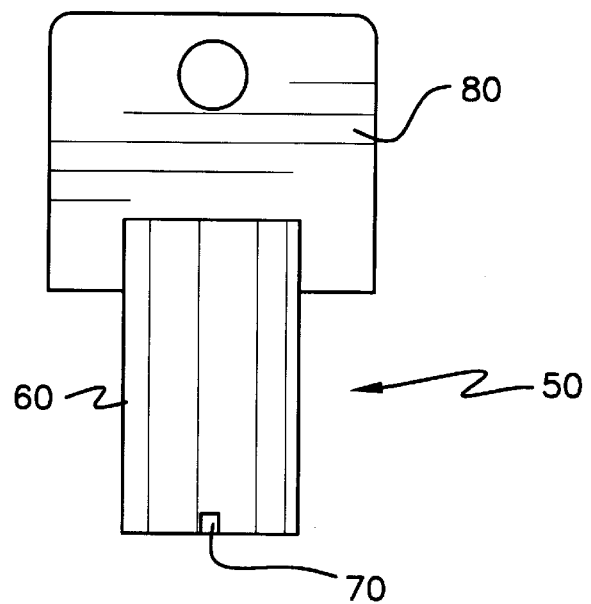
FIG. 5a is a side view of an "O" tool employed in the present invention.

FIGS. 5a and 5b show a side and top view of the removal tool (50). The tool (50) has a head or grip portion (80) attached to a shaft (60). At the lower end of the shaft (60), projections (70,71) extend outwardly. The projections (70, 71) mate with the notches (30,31). The tool (50) as shown in FIG. 5b is that which would be used for the screw (5) shown in FIG. 1a. Though not shown, the bottom of the shaft (60) is hollow. The remaining bottom edge (62) is narrow enough so that it fits into the groove (25). The central projection (40) is simply accepted within the hollow portion of the shaft (60).

In using the present invention, a number of screws (5) are selected, usually each having the same notch (30,31) configuration. The tool having the matching configuration is selected and the shaft (60) is inserted into the groove (25) and rotated until the projections (70,71) engage the notches (30,31). The screws (5) are then threaded into a receiving chamber (not shown) and the tool (50) is turned to insert or remove the screws (5).

Primarily, the present invention is intended to be used on license plates for automobiles, but is not exclusively limited thereto. It is to be understood that the present invention is not limited to the sole embodiment described above, but encompasses any and all embodiments within the scope of the following claims.

I claim:

1. An anti-theft device comprising at least one screw; said at least one screw comprising:

a head;

a threaded shaft disposed adjacent to said head, a groove positioned on said head, said head having at least two notches extending radially therefrom; and a central projection on said head, said projection separated from the remainder of said head by said groove, wherein said projection is at least equal to the height of the remainder of said head.

2. The anti-theft device according to claim 1, wherein said groove is circular.

3. The anti-theft device according to claim 1, wherein said groove is polygonal.

4. The anti-theft device according to claim 1, wherein said at least two notches are asymmetrically positioned around the periphery of said groove.

5. The anti-theft device according to claim 1, further comprising a removal tool which interlocks with said groove and said notches.

6. The anti-theft device according to claim 5, wherein said removal tool has a removal tool shaft attached to a grip, wherein said removal tool shaft terminates at an end opposite said grip.

7. The anti-theft device according to claim 6, wherein said removal tool shaft has at least two projections located at its termination.

8. The anti-theft device according to claim 7, wherein said projections are receivable into said at least two notches.

9. The anti-theft device according to claim 7, wherein the positioning of said at least two notches is identical to the positioning of said projections on said removal tool.

10. The anti-theft device according to claim 6, wherein said removal tool shaft is receivable into said groove.

11. The anti-theft device according to claim 6, wherein said removal tool shaft is hollow.

12. The anti-theft device according to claim 6, wherein said groove and said removal tool are circular such that the circumference of said groove is equal to the circumference of said removal tool shaft.

13. The anti-theft device according to claim 1, wherein said groove is centrally located atop said head.

14. The anti-theft device according to claim 1, wherein said at least two notches extend radically outwardly from said groove.

15. The anti-theft device according to claim 1, wherein said at least two notches are at a depth matching the depth of said groove. notches is identical to the positioning of said projections on said removal tool.

16. The anti-theft device according to claim 1, wherein the at least one screw is a plurality of screws.

17. A license plate protection kit comprising:
several screws having a threaded shaft and a head attached thereto for insertion through a license plate; and
a tool for removing said screws from said license plate;
wherein said head has a circular groove and at least two notches intersecting said groove for receiving said tool.

18. An anti-theft device comprising at least one screw; said at least one screw comprising:
a head,
a threaded shaft disposed adjacent to said head; and
a circular groove positioned on said head, said head having at least two notches extending radially therefrom.

19. An anti-theft device comprising at least one screw; said at least one screw comprising:
a head;
a threaded shaft disposed adjacent to said head; and
a groove positioned on said head, said head having at least two notches asymmetrically positioned around the periphery of said groove and extending radially therefrom.

* * * * *